(12) United States Patent
Moore

(10) Patent No.: US 8,946,964 B1
(45) Date of Patent: Feb. 3, 2015

(54) MODULAR WINDINGS FOR AN ELECTRIC MACHINE

(76) Inventor: Christopher Moore, Prospect, KY (US)

( * ) Notice: Subject to any disclaimer, the term of this patent is extended or adjusted under 35 U.S.C. 154(b) by 528 days.

(21) Appl. No.: 13/204,241

(22) Filed: Aug. 5, 2011

(51) Int. Cl.
*H02K 3/04* (2006.01)
*H02K 3/00* (2006.01)

(52) U.S. Cl.
USPC ............ 310/201; 310/194; 310/198; 310/206

(58) Field of Classification Search
CPC .................................. H02K 3/04; H01F 27/28
USPC ............ 310/188, 198, 200, 201, 206; 336/58; 29/605
See application file for complete search history.

(56) References Cited

U.S. PATENT DOCUMENTS

| | | | |
|---|---|---|---|
| 335,105 A * | 2/1886 | Boissier | ........................ 310/201 |
| 1,169,475 A | 1/1916 | Finnigan | |
| 1,801,214 A | 4/1931 | Henke | |
| 2,858,484 A | 10/1958 | Sonnemann | |
| 2,985,779 A | 5/1961 | Flaningam et al. | |
| 3,163,810 A | 12/1964 | Schaefer | |
| 3,334,254 A | 8/1967 | Kober | |
| 3,543,206 A | 11/1970 | King | |
| 3,567,974 A | 3/1971 | Spingler | |
| 3,991,354 A | 11/1976 | Rosa et al. | |
| 4,081,727 A | 3/1978 | Green | |
| 4,242,625 A | 12/1980 | Hedges | |
| 5,191,256 A | 3/1993 | Reiter, Jr. et al. | |
| 5,259,531 A | 11/1993 | Bennett | |
| 5,278,354 A | 1/1994 | Lhomme | |
| 5,422,526 A | 6/1995 | Kawabata et al. | |
| 5,608,279 A | 3/1997 | Murray | |
| 5,615,394 A | 3/1997 | Albrecht | |
| 5,675,230 A | 10/1997 | Dunfield | |
| 5,804,901 A | 9/1998 | Ogino et al. | |
| 6,005,321 A | 12/1999 | Bolton et al. | |
| 6,269,531 B1 | 8/2001 | Mercado et al. | |
| 6,278,354 B1 | 8/2001 | Booth | |
| 6,380,646 B1 | 4/2002 | Bernauer et al. | |
| 6,445,272 B1 | 9/2002 | Mercado et al. | |
| 6,774,757 B2 | 8/2004 | Fujiyoshi et al. | |
| 6,958,561 B2 | 10/2005 | Liao | |
| 7,071,807 B1 | 7/2006 | Herbert | |
| 7,119,467 B2 | 10/2006 | Dooley | |
| 7,268,456 B2 | 9/2007 | Harada et al. | |
| 7,309,939 B2 | 12/2007 | Dooley | |
| 7,436,098 B2 | 10/2008 | Dooley | |

(Continued)

FOREIGN PATENT DOCUMENTS

| | | |
|---|---|---|
| JP | 58066545 | 4/1983 |
| JP | 4021501 | 1/1992 |

(Continued)

OTHER PUBLICATIONS

Machine Translation JP2007281401 (2007).*

*Primary Examiner* — Tran Nguyen
*Assistant Examiner* — Jose Gonzalez Quinones
(74) *Attorney, Agent, or Firm* — Middleton Reutlinger; Alexander P. Brackett

(57) ABSTRACT

The invention incorporates a modular winding system for an electrical machine that includes a plurality of readily assembled modular windings for engaging a plurality of stator teeth of the machine. Windings comprise a pair of opposed legs terminating in upper and lower flanges, and are readily secured together to make consistent electrical contact between adjacent windings.

10 Claims, 20 Drawing Sheets

(56) References Cited

U.S. PATENT DOCUMENTS

| | | |
|---|---|---|
| 7,605,505 B2 | 10/2009 | Minke et al. |
| 8,268,495 B2 | 9/2012 | Manabe et al. |
| 2002/0057031 A1 | 5/2002 | Ueda et al. |
| 2002/0163275 A1* | 11/2002 | Hsu ................................ 310/194 |
| 2003/0038557 A1 | 2/2003 | Strothmann |
| 2006/0113857 A1 | 6/2006 | Honkura et al. |
| 2007/0090711 A1 | 4/2007 | Carl, Jr. et al. |
| 2007/0273236 A1 | 11/2007 | Kaumann et al. |
| 2008/0074223 A1 | 3/2008 | Pribonic |
| 2008/0174212 A1 | 7/2008 | Rudel et al. |
| 2008/0220298 A1 | 9/2008 | Ishikawa et al. |
| 2008/0256783 A1 | 10/2008 | Alfermann et al. |
| 2008/0315706 A1 | 12/2008 | Dooley |
| 2009/0152968 A1 | 6/2009 | Ishikawa et al. |
| 2009/0160391 A1 | 6/2009 | Flynn |
| 2009/0195109 A1 | 8/2009 | Horst |
| 2009/0230807 A1* | 9/2009 | Fubuki et al. ................. 310/201 |
| 2009/0230808 A1 | 9/2009 | Tatebe |
| 2010/0013346 A1 | 1/2010 | Peek |
| 2010/0013438 A1 | 1/2010 | Anwar et al. |
| 2010/0013490 A1 | 1/2010 | Manabe et al. |
| 2010/0019603 A1 | 1/2010 | Saban |
| 2010/0019613 A1 | 1/2010 | Saban et al. |
| 2010/0045219 A1 | 2/2010 | Ajima et al. |
| 2010/0066198 A1* | 3/2010 | Fubuki et al. ................. 310/208 |
| 2010/0119389 A1 | 5/2010 | Lazebnik et al. |
| 2010/0148622 A1 | 6/2010 | Dooley |
| 2010/0188181 A1* | 7/2010 | Urano et al. ................... 336/198 |
| 2011/0012463 A1 | 1/2011 | Duncan et al. |
| 2011/0057537 A1* | 3/2011 | Matsushita et al. ........... 310/208 |

FOREIGN PATENT DOCUMENTS

| | | | |
|---|---|---|---|
| JP | 2002153001 | | 5/2002 |
| JP | 2002262498 | | 9/2002 |
| JP | 2002369428 | | 12/2002 |
| JP | 2003204647 | | 7/2003 |
| JP | 20042373 | | 8/2004 |
| JP | 2007281401 A | * | 10/2007 |
| JP | 2007312449 | | 11/2007 |
| JP | 2007336650 | | 12/2007 |
| JP | 2010098936 | | 8/2008 |
| JP | 2008228541 | | 9/2008 |
| JP | 2008295202 | | 12/2008 |
| WO | WO 2011042614 A1 | * | 4/2011 |

\* cited by examiner

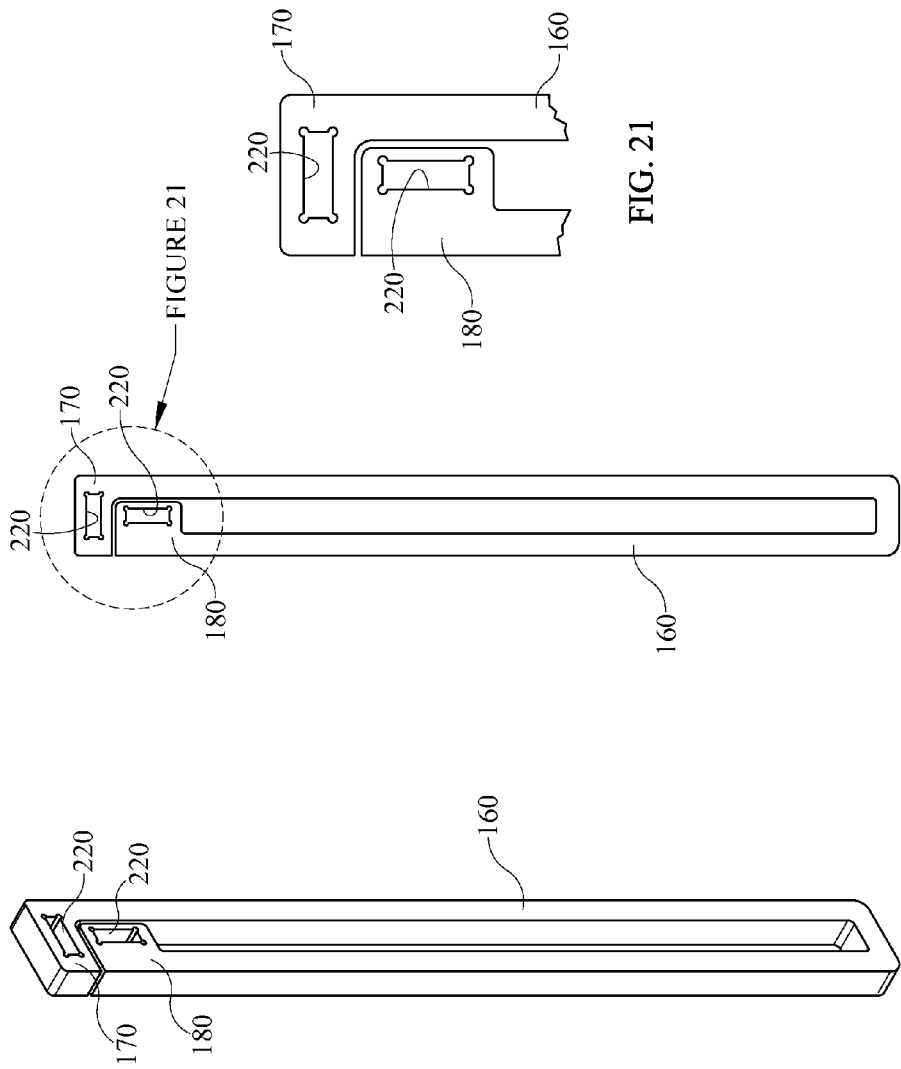

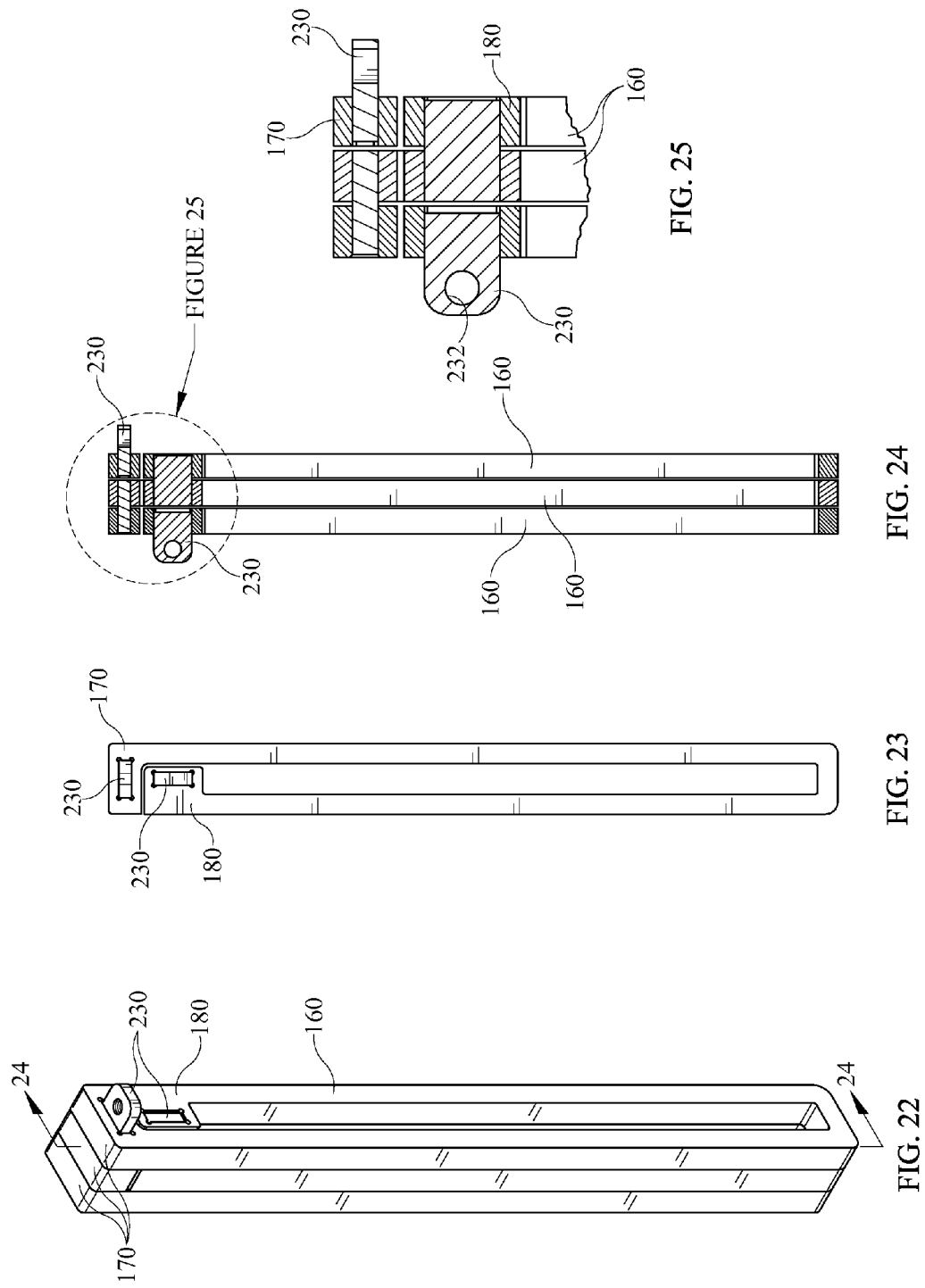

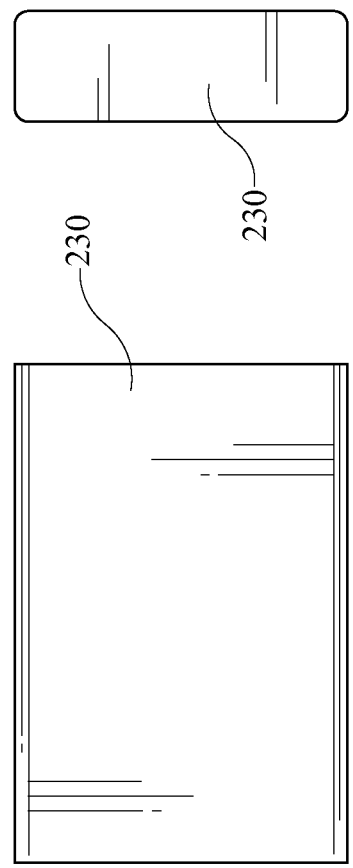
FIG. 27
FIG. 28
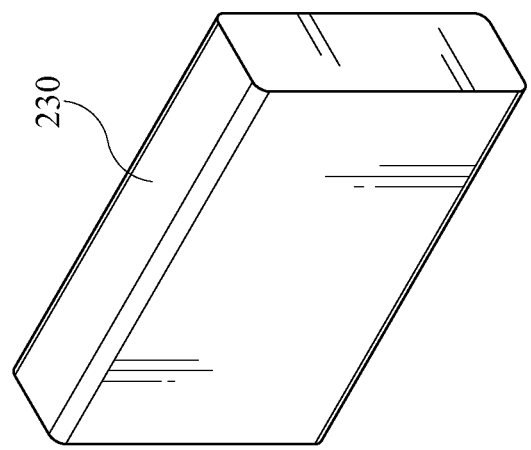
FIG. 26

MODULAR WINDINGS FOR AN ELECTRIC MACHINE

CROSS-REFERENCE TO RELATED APPLICATIONS

The present application claims the benefit of co-pending U.S. Utility application Ser. No. 13/007,129, filed Jan. 14, 2011, and entitled "Modular Component Electric Machine".

BACKGROUND OF THE INVENTION

1. Field of the Invention

The present invention relates generally to a high efficiency brushless direct current motor or generator and more specifically to an improved modular winding system that can be employed in conjunction with a stator having a plurality of stator teeth to produce an inexpensive, high power density motor.

2. Description of the Related Art

Many designs and configurations of electric motors and generators are presently in use in the field of alternating current (AC) and direct current (DC) motors. Both AC and DC motors are in widespread use in many industries and are increasingly utilized in transportation applications where high-torque and low power consumption are two seemingly contradictory goals. The magnetic motor industry is continuously attempting to design motors with increased and enhanced efficiency to facilitate motor operation with a minimum of electric power consumption, thereby gaining competitive advantage. Motors utilizing an array of differing rotor and stator designs have been devised in an attempt to provide higher power densities throughout the motor rotor and stator, thereby leading to enhanced operational efficiency.

However, there is a need in the art for a motor or generator assembly employing a more efficient rotor and stator design to enhance electromagnetic flux density in the motor, particularly the stator tooth windings. Traditionally, many stator windings are expensive to produce and are electrically inefficient, requiring end windings that detract from the electrical efficiency of the motors.

However, a design that permits a simplified winding construction that eliminates end windings and reduces motor manufacturing costs would lead to enhanced energy efficiency and is therefore highly desirable. Furthermore, a motor design taking advantage of the superior magnetic properties of a modular winding system to increase power density in the motor is also desirable.

Additionally, most prior art motors employ conventional stator tooth windings that necessarily require additional machine weight, field losses, and axial length due to the arrangement of the end windings. Thus there is a need in the art for a motor having improved windings that reduce the electromagnetic disadvantages as well as the manufacturing disadvantages of conventional DC motor winding designs.

SUMMARY OF THE INVENTION

The present invention overcomes the disadvantages of the prior art by providing an electric machine, namely a motor or generator, having a modular winding construction that is lightweight, easily manufactured and assembled, and provides a very high power density in the motor, thereby enhancing motor efficiency.

The instant invention comprises a stator assembly that utilizes a plurality of modular windings that may be readily assembled on stator teeth with a minimum of cost and labor. These modular stator windings provide a very low resistance, configurable stator winding assembly that eliminate conventional end windings entirely and thereby reduce the axial length of the motor, and therefore its overall profile. Furthermore, the windings of the present invention enable a greater cross-sectional conductor area to be utilized for a given stator, thereby enhancing current flow through the windings and power density within the motor.

Other features, objects, and advantages of the invention will become readily apparent from the detailed description of the preferred embodiments taken in conjunction with the attached drawing Figures.

BRIEF DESCRIPTION OF THE DRAWING FIGURES

FIG. 19 is a perspective view of a winding in accordance with one embodiment of the present invention.

FIG. 20 is a side view of a winding in accordance with one embodiment of the present invention.

FIG. 21 is a detailed view of upper and lower winding flanges in accordance with one embodiment of the present invention.

FIG. 22 is a perspective view of a winding assembly in accordance with one embodiment of the present invention.

FIG. 23 is a side view of a winding assembly in accordance with one embodiment of the present invention.

FIG. 24 is a cross-sectional view of a winding assembly taken along the line 24-24 of FIG. 22 in accordance with one embodiment of the present invention.

FIG. 25 is a detailed view of the winding assembly of FIG. 24 in accordance with one embodiment of the present invention.

FIG. 26 is a perspective view of a winding key in accordance with one embodiment of the present invention.

FIG. 27 is a side view of a winding key in accordance with one embodiment of the present invention.

FIG. 28 is an end view of a winding key in accordance with one embodiment of the present invention.

DETAILED DESCRIPTION OF THE PREFERRED EMBODIMENT(S)

Figure 1:
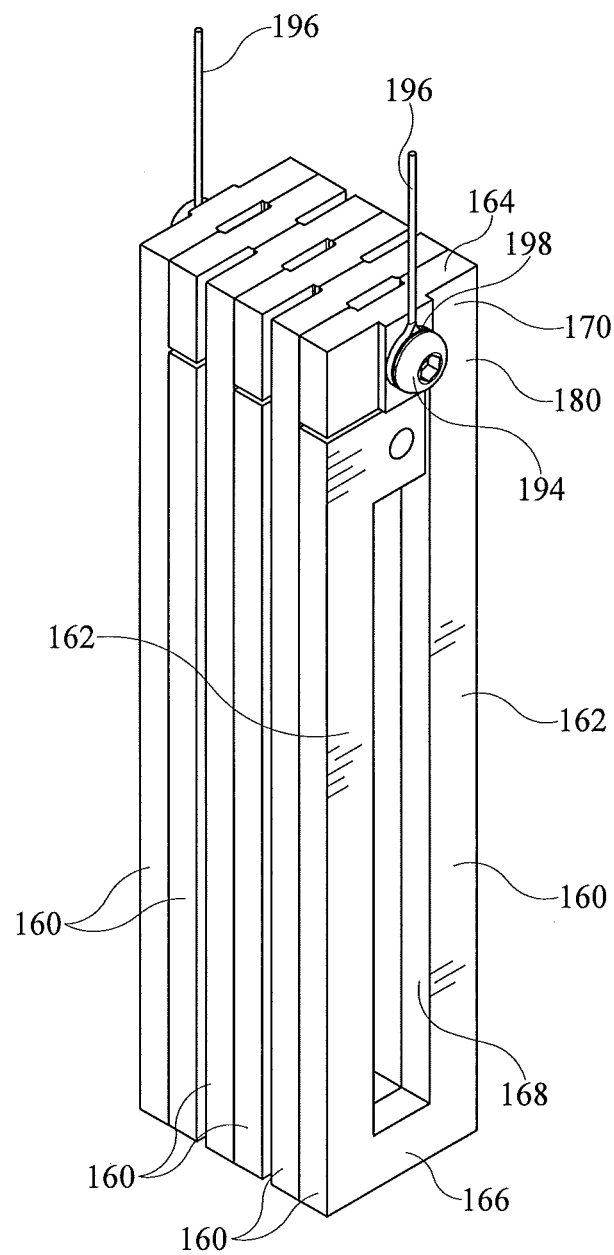
FIG. 1 is a perspective view of a winding assembly in accordance with one embodiment of the present invention.
Figure 2:
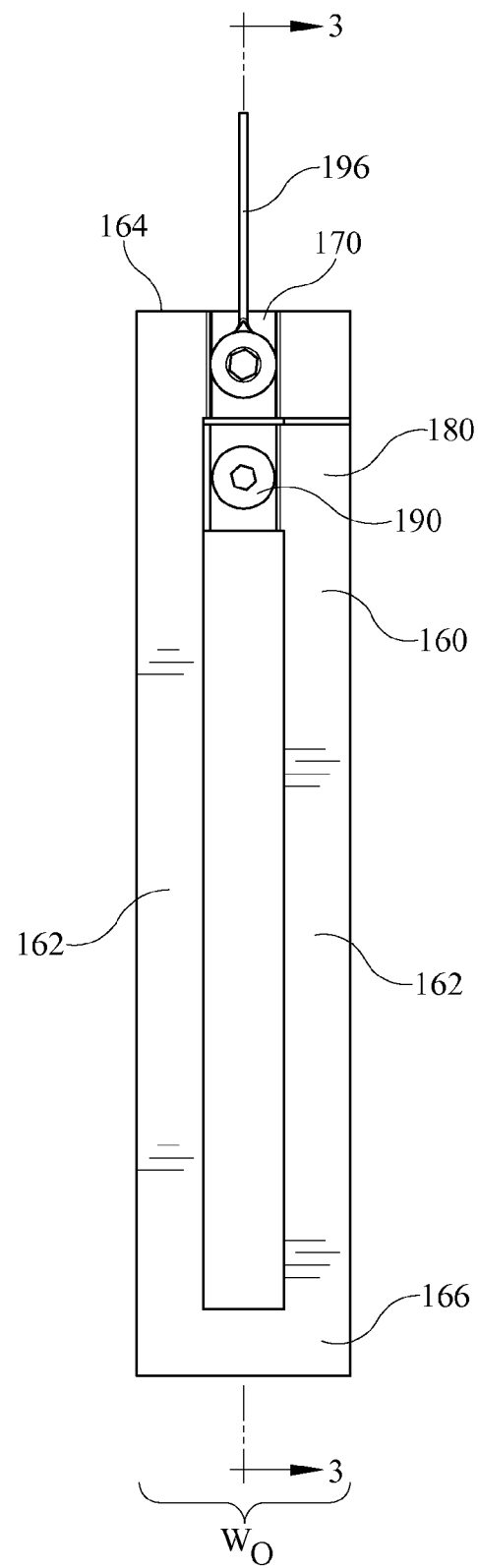
FIG. 2 is a side view of a winding assembly in accordance with one embodiment of the present invention.
Figure 3:
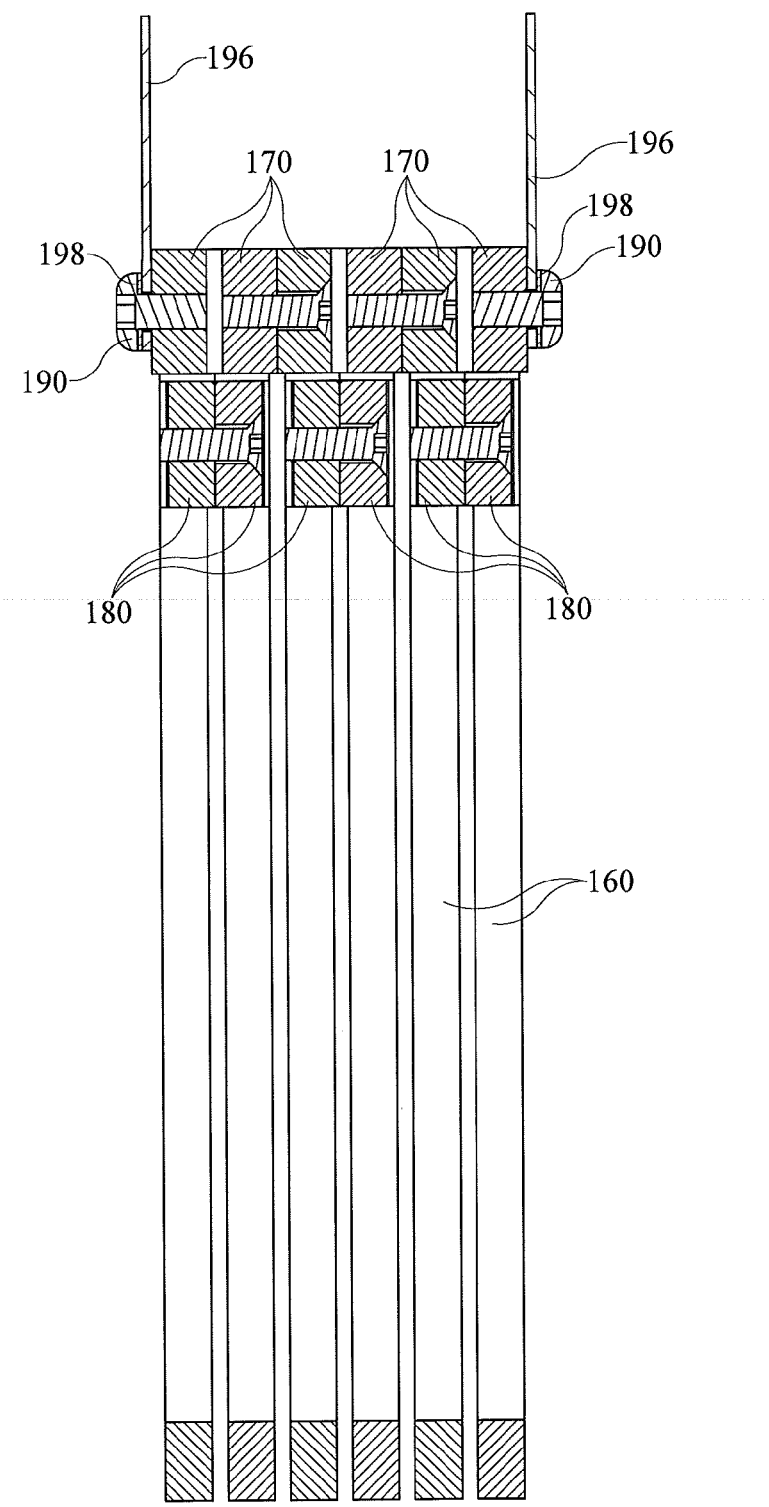
FIG. 3 is a cross-sectional view of a winding assembly taken along the line 3-3 of FIG. 2 in accordance with one embodiment of the present invention.
Figure 4:
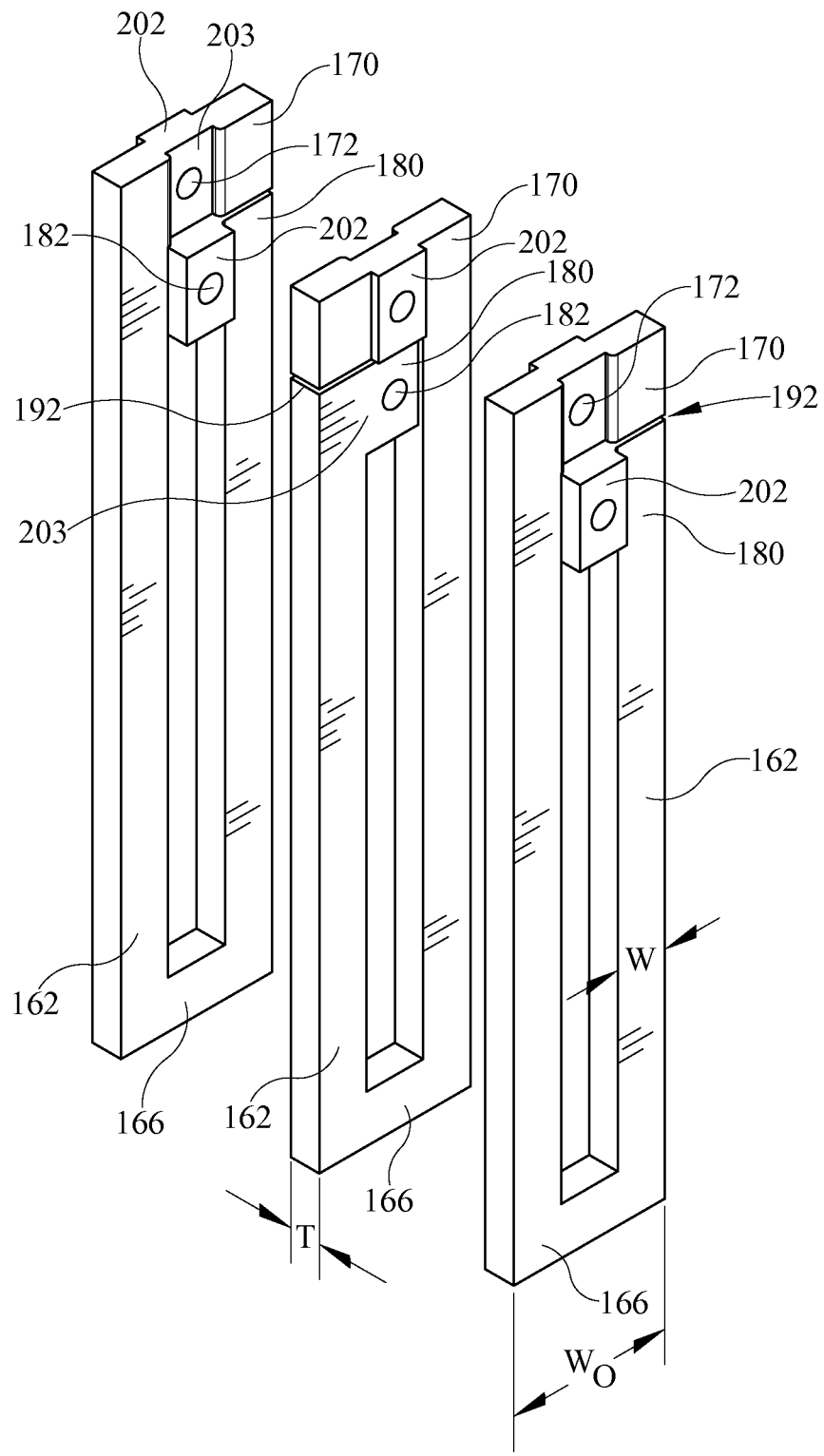
FIG. 4 is an exploded view of a winding assembly in accordance with one embodiment of the present invention.
Figure 5:
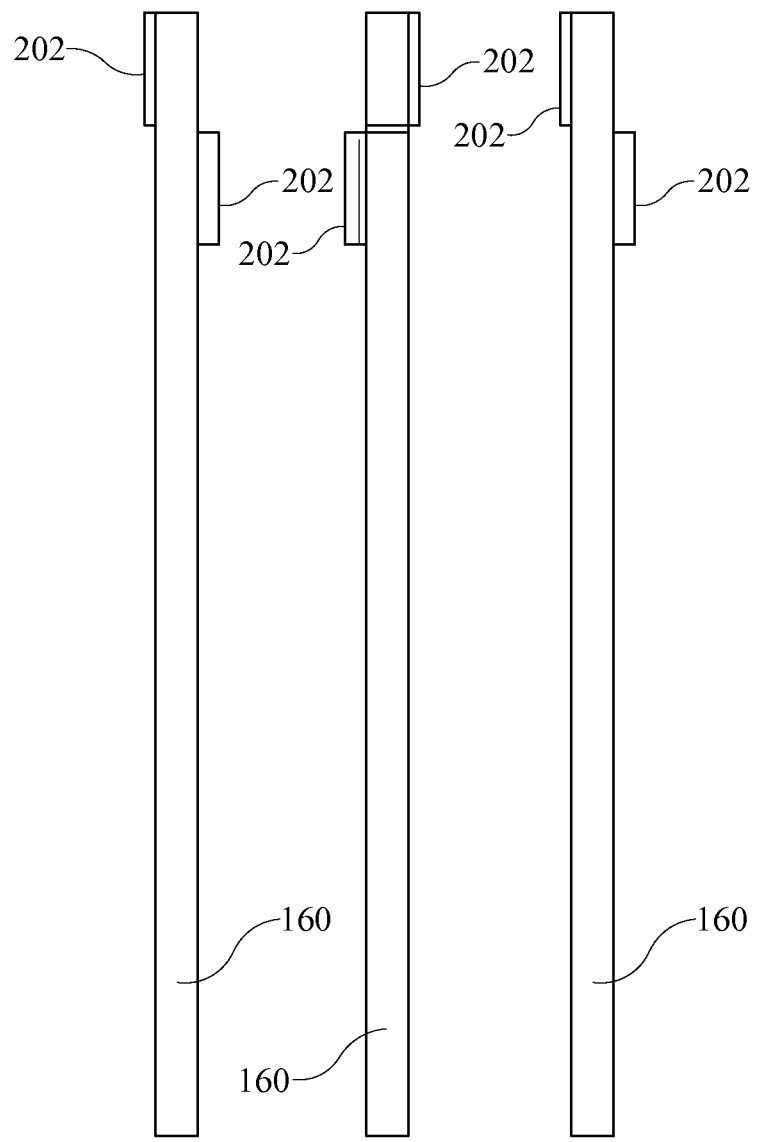
FIG. 5 is a side view of a winding assembly in accordance with one embodiment of the present invention.
Figure 6:
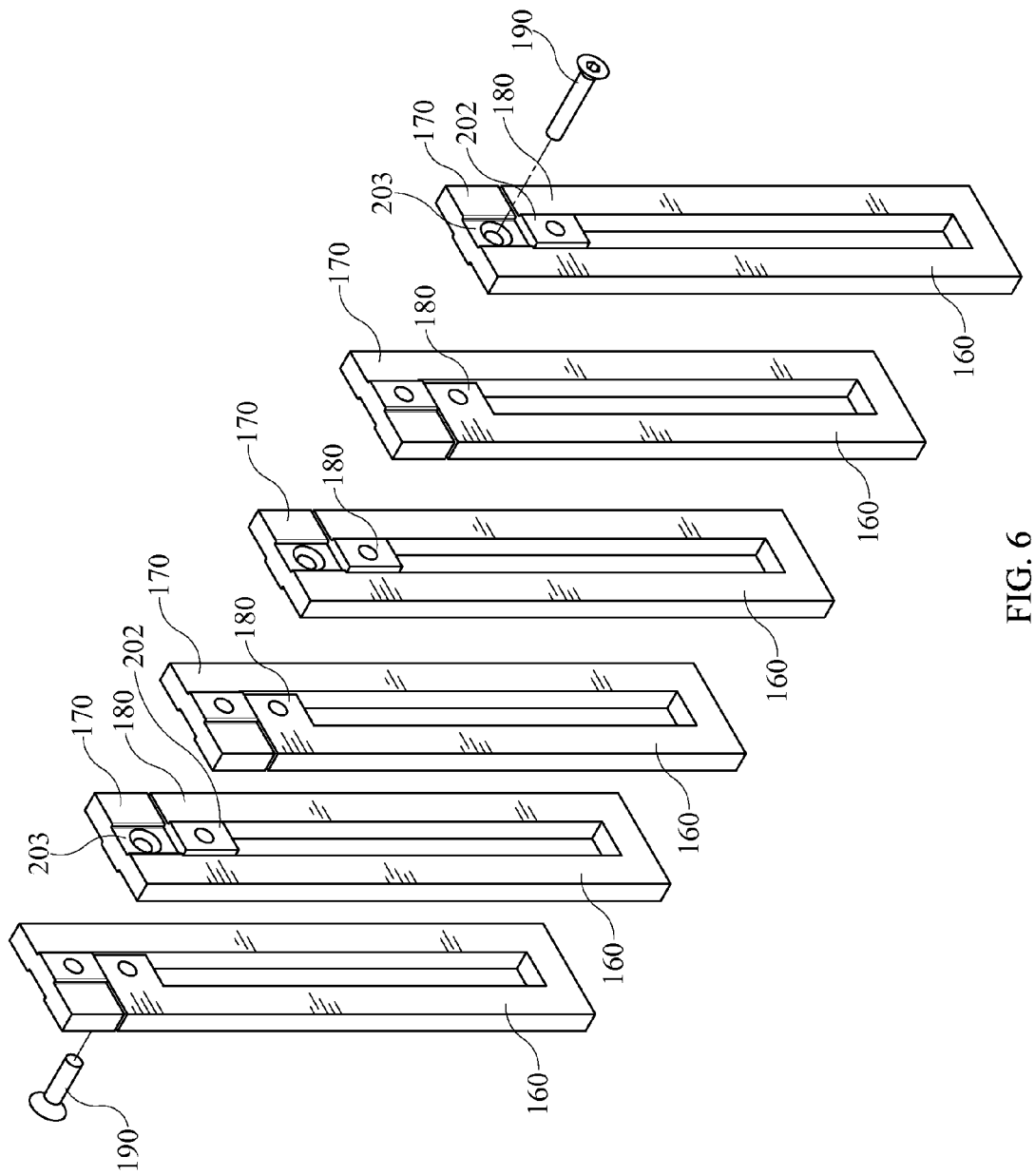
FIG. 6 is an exploded view of a winding assembly in accordance with one embodiment of the present invention.
Figure 7:
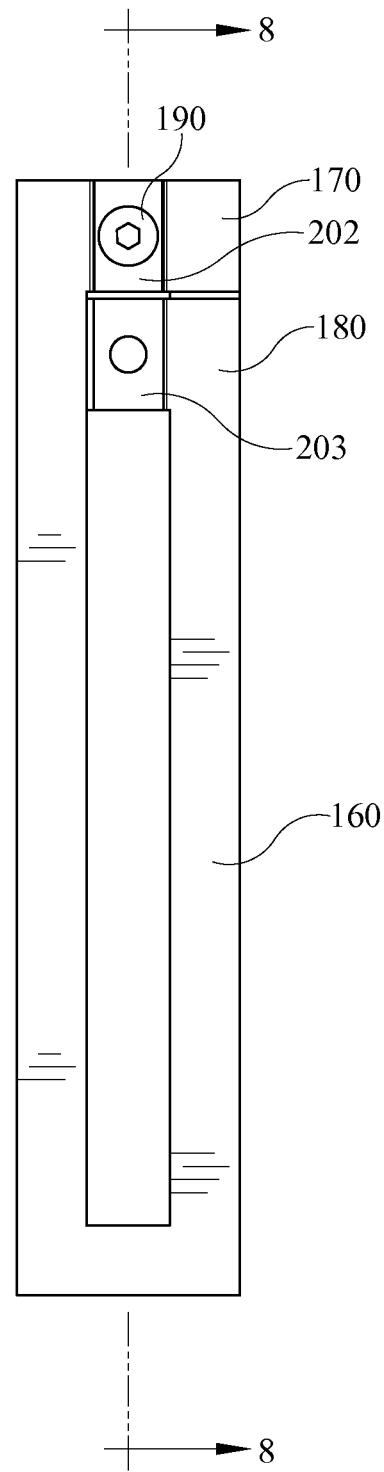
FIG. 7 is a side view of a winding assembly in accordance with one embodiment of the present invention.
Figure 8:
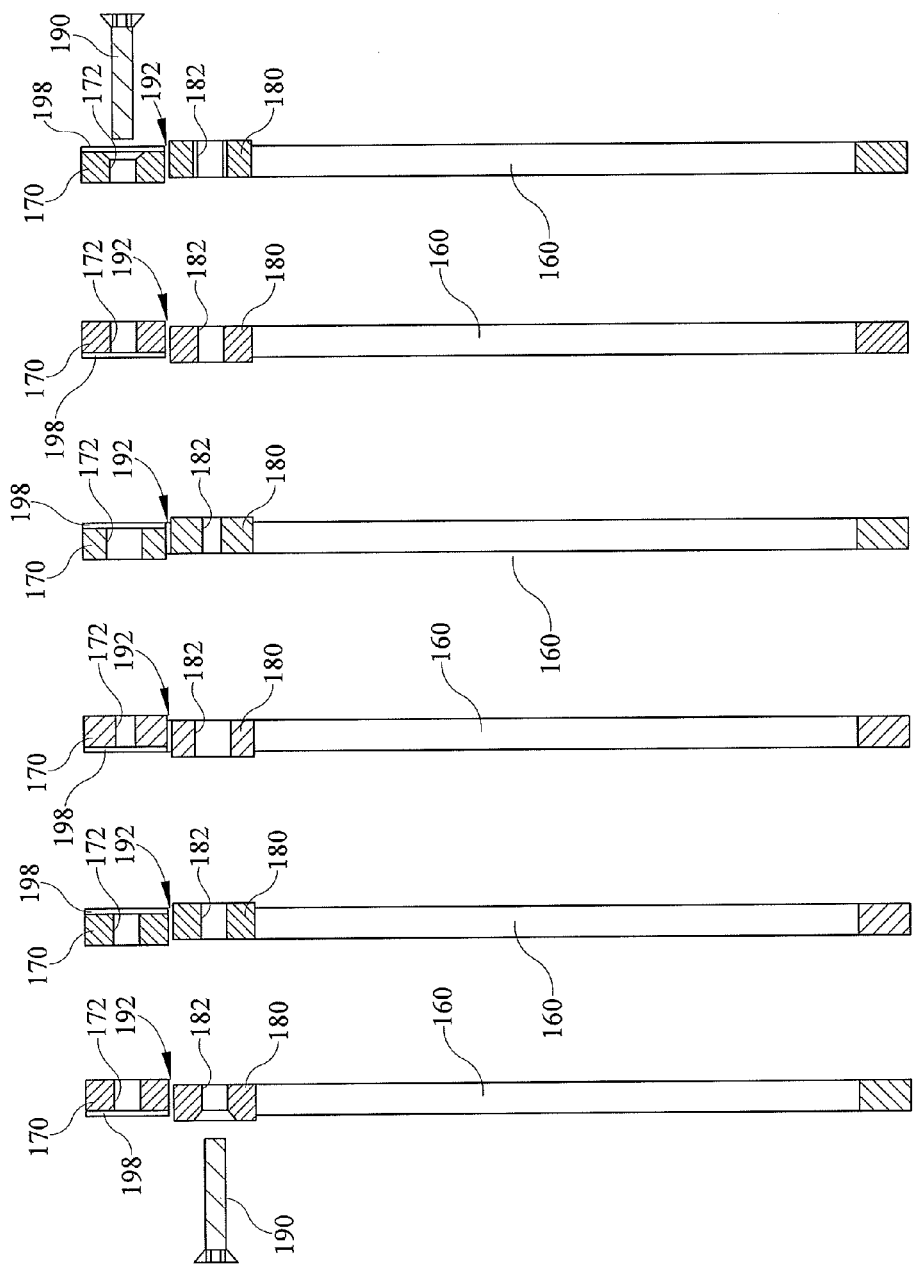
FIG. 8 is a cross-sectional view of a winding assembly taken along the line 8-8 of FIG. 7 in accordance with one embodiment of the present invention.

Referring now to drawing FIGS. 1-11 and 29, and in accordance with one embodiment of the present invention, a stator assembly 100 comprises annular central hub 110 having an outer circumferential portion 116 having a plurality of stator teeth 120 either secured, or integral to, hub 110. Stator teeth 120 extend generally outwardly from hub 110 and may be shaped to accept a plurality of modular windings 160.

Windings 160 may comprise a pair of opposed legs 162 and opposed top 164 and bottom 166 ends that generally define an aperture 168 through which stator teeth 120 extend. Windings may be stamped or cut from a sheet or plate of conductive material, for example copper or an alloy thereof, as is often used to produce conventionally wound electric machines. Each winding 160 further comprises an upper flange 170 and a lower flange 180, each having an aperture 172, 182 therein respectively, for receiving a fastener 190 (for example, a bolt, screw or heli-coil fastener) and concomitant nut (or heli-coil insert) 194 that secures windings 160 together. Upper flange 170 and lower flange 180 are separated by an air gap 192 such that each winding 160 defines a current path from upper flange 170 through legs 162 and thence into lower flange 180.

In one embodiment of the present invention, FIGS. 4 and 12-14 further depict a plurality of windings 160 having legs 162 of varying widths W and thicknesses T and windings having overall widths $W_o$. The leg 162 width W, overall width $W_o$ and leg 162 thickness T of each winding 160 may be varied such that the cross-sectional areas of each leg 162 of any winding 160 are substantially identical and thus are substantially equal in electrical resistance R. The windings 160 that are disposed over stator teeth 120 nearest to ring 142 of stator body 140 have smaller overall widths $W_o$, and smaller leg 162 widths W, while having greater thickness T. In contradistinction, windings 160 positioned on stator teeth 120 farthest from ring 142 have greater overall widths $W_o$ and leg 162 thickness T, while having reduced leg 162 widths W. The purpose of this feature of the invention is to enable successive windings 160 to fit between teeth 120 snugly while occupying the increasingly larger area between stator teeth 120 as the windings are positioned over the teeth farther from stator ring 142.

As best seen in FIGS. 8-14 and 29 windings 160 are assembled together around stator teeth 120 by fasteners 190 inserted through aligned apertures 172, 182 of stacked, opposed windings 160, and secured by bolt 194 or the equivalent. Fasteners 190 may be first inserted through an insulating washer that mates with apertures 172 and 182 of winding 160 disposed proximate the outer edge of each stator tooth 120. In the embodiment shown in FIG. 8, fasteners 190 may comprise insulated (non-conductive) fasteners that do not conduct electrical current, thereby simply providing a clamping force between alternate windings 160.

Furthermore, in one embodiment of the invention shown for example in FIG. 1, an electrical lead 196 having an aperture therein is positioned over fastener 190 and is in contact with upper flange 170 of winding 160. Electrical lead 196 is then connected to a source of electrical current (not shown). Similarly, insulating washers 198 and an electrical lead 196 are provided on the winding 160 that is positioned closest to stator ring 142 to complete the electrical circuit through windings 166. In one embodiment of the invention, best seen in FIG. 3, a conductive fastener 190 connects a pair of adjacent windings 160, either through the upper flanges 170 or lower flanges 180. Each fastener 190 extends only between an adjacent pair of windings 160, thereby providing a single current path through each winding from lead 196 to lead 196.

Figure 12:
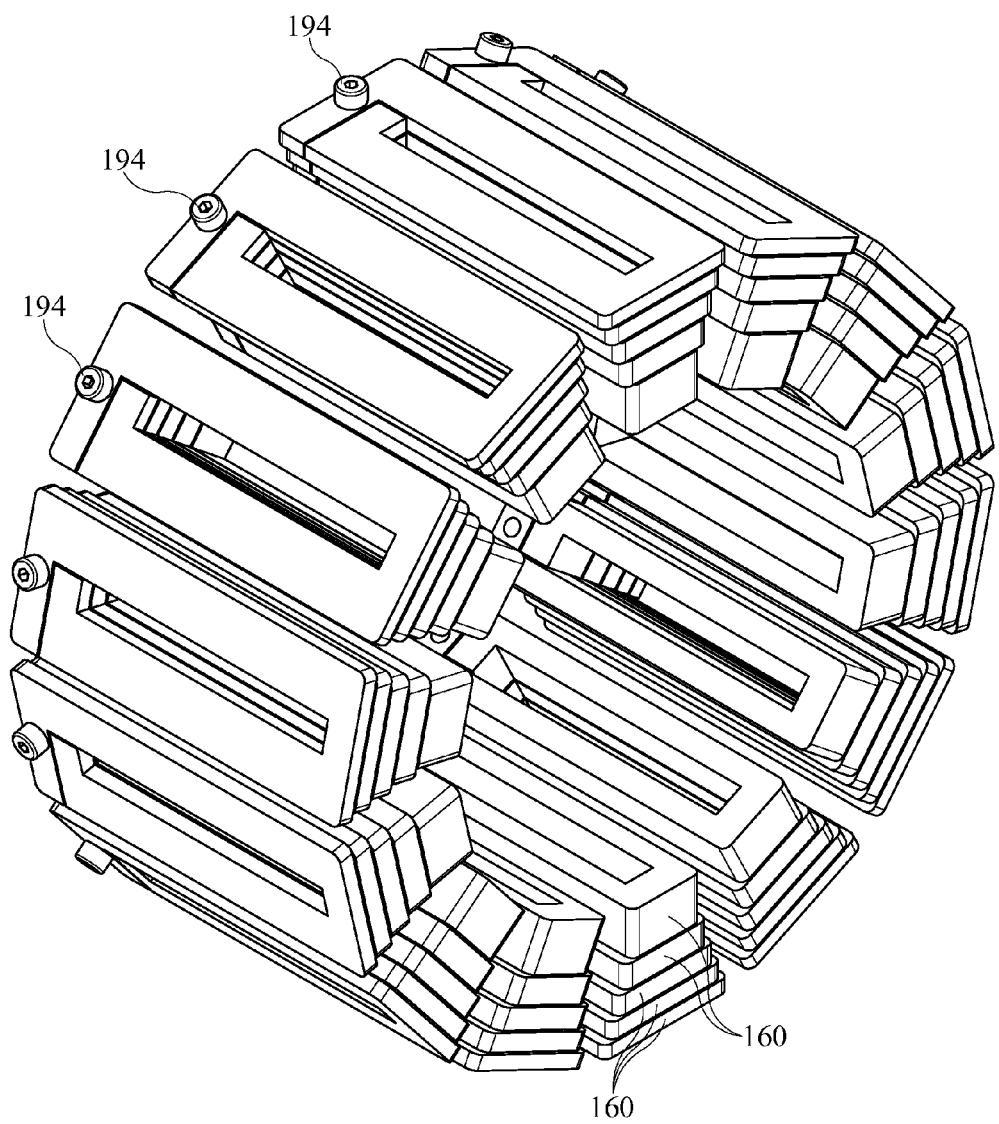
FIG. 12 is a partially assembled perspective view of a winding assembly in accordance with one embodiment of the present invention.
Figure 13:
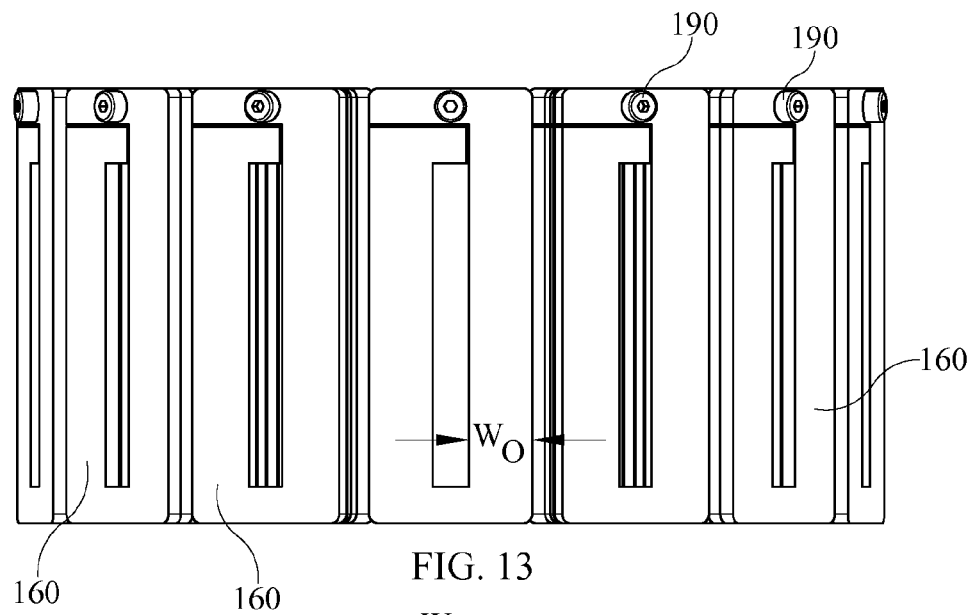
FIG. 13 is a side view of an assembled winding assembly in accordance with one embodiment of the present invention.
Figure 14:
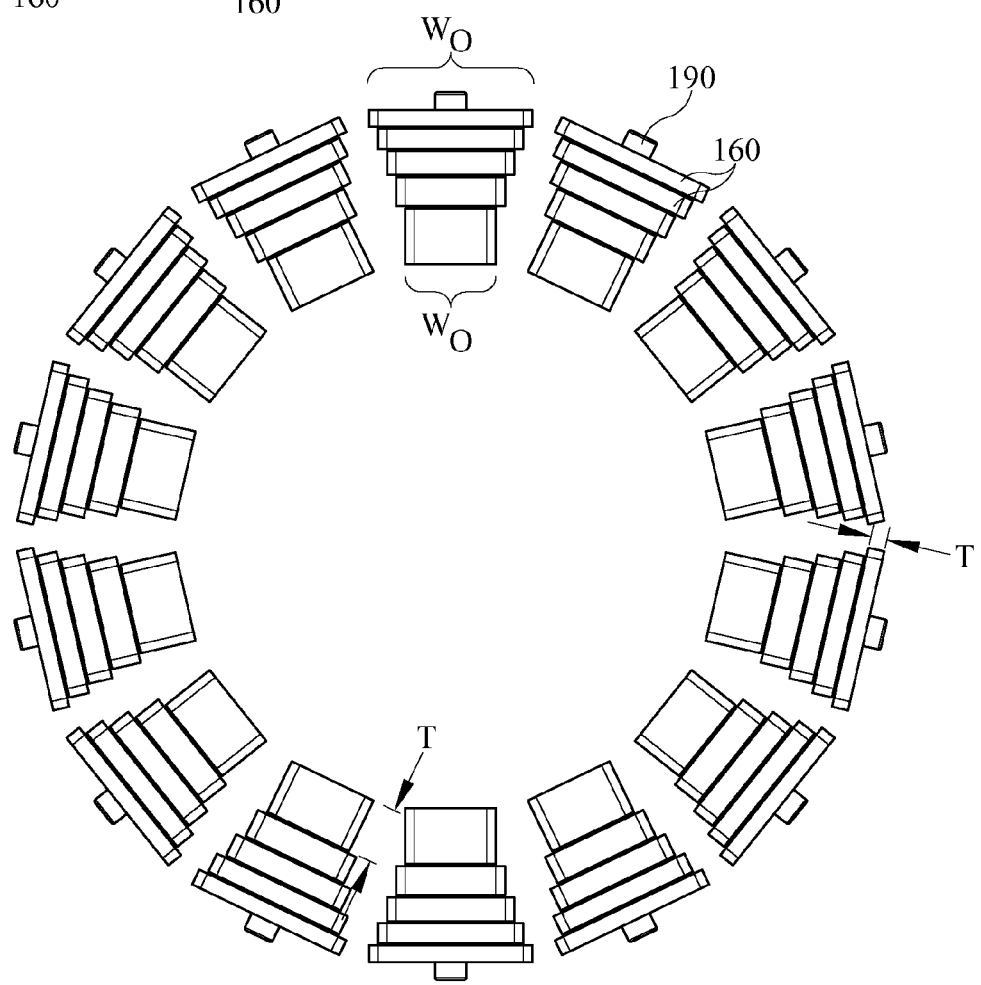
FIG. 14 is a top view of an assembled winding assembly in accordance with one embodiment of the present invention.
Figure 15:
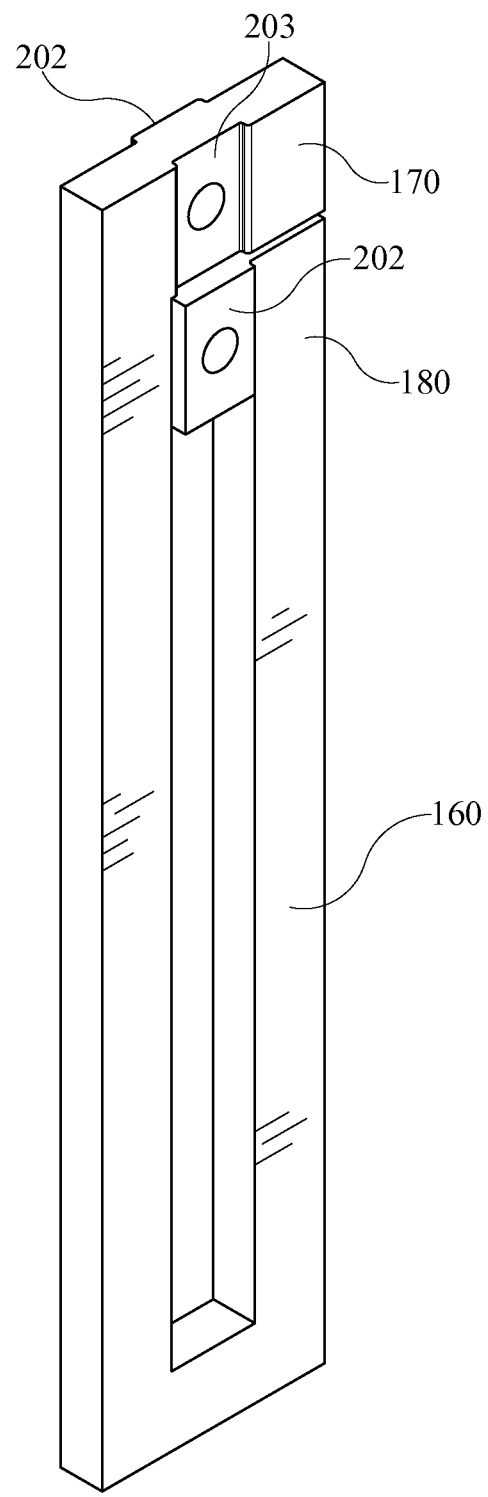
FIG. 15 is a perspective view of a winding in accordance with one embodiment of the present invention.
Figures 16, 17:
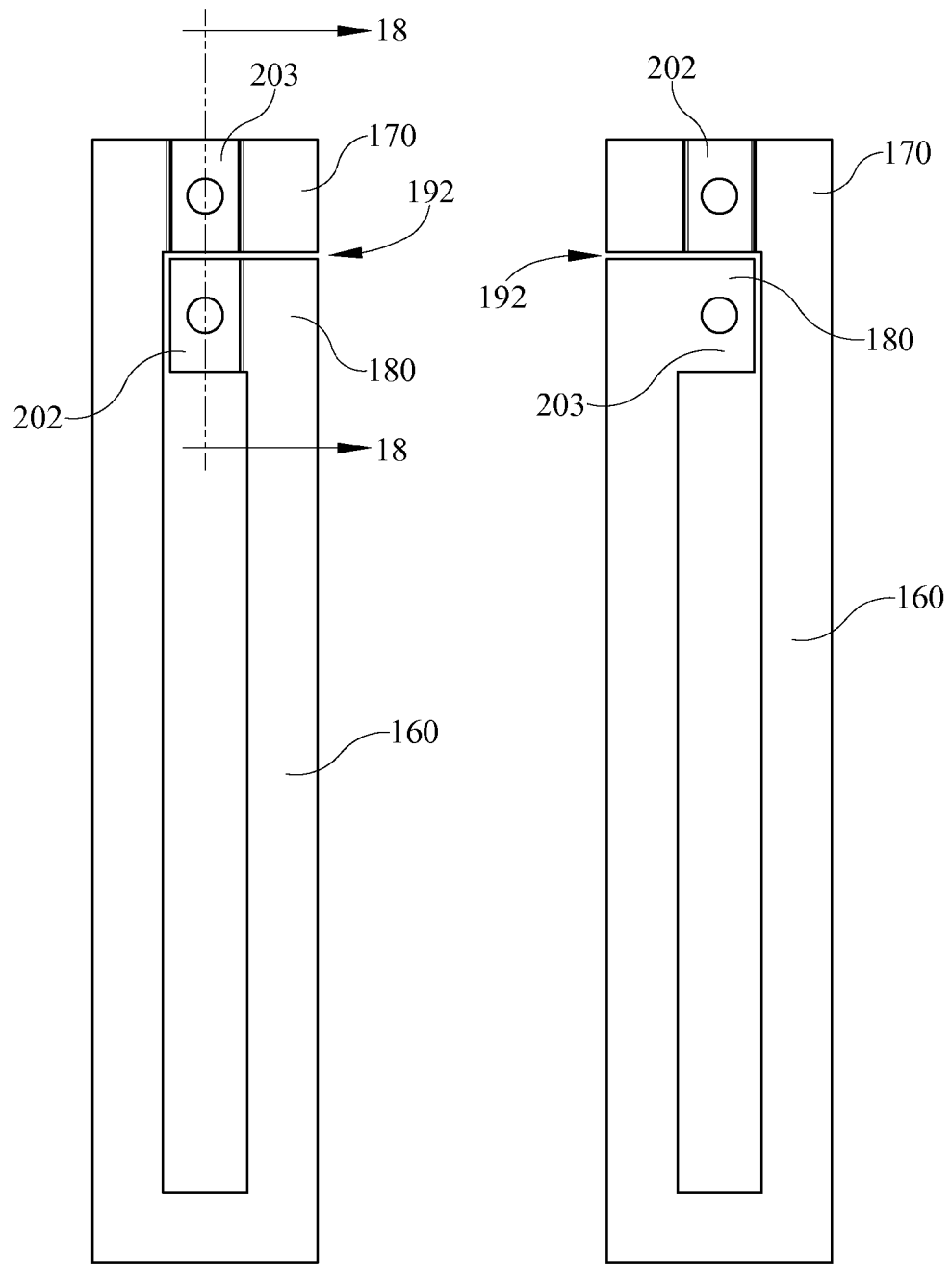
FIG. 16 is a side view of a winding in accordance with one embodiment of the present invention.
FIG. 17 is a side view of a winding in accordance with one embodiment of the present invention.
Figure 18:
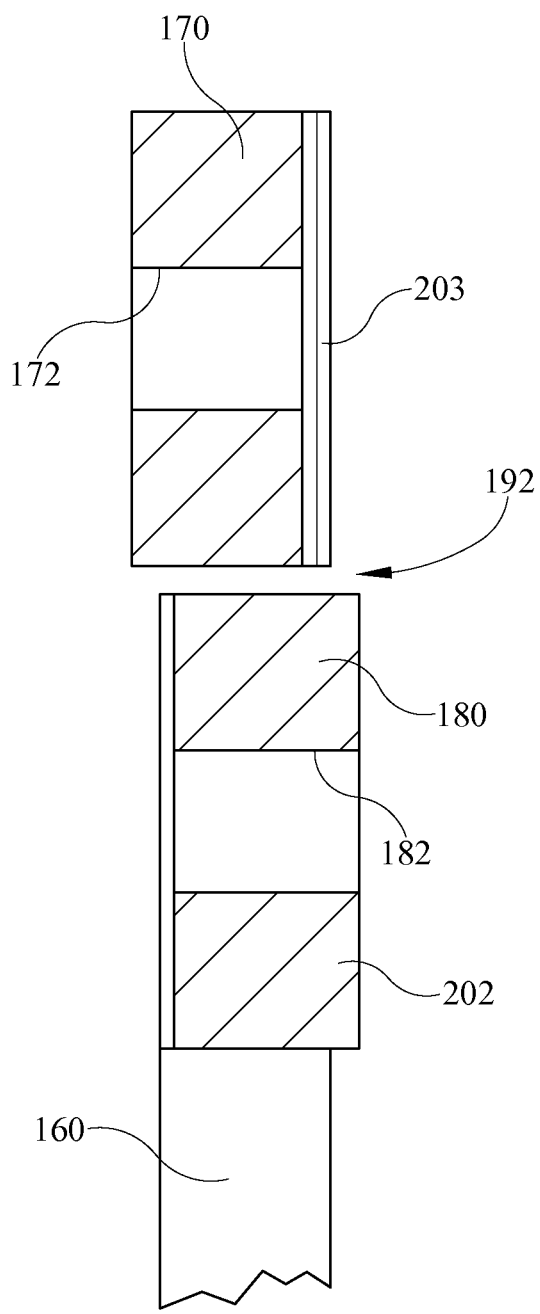
FIG. 18 is a detailed cross-sectional view of a winding taken along the line 18-18 of FIG. 16 in accordance with one embodiment of the present invention.
Figure 29:
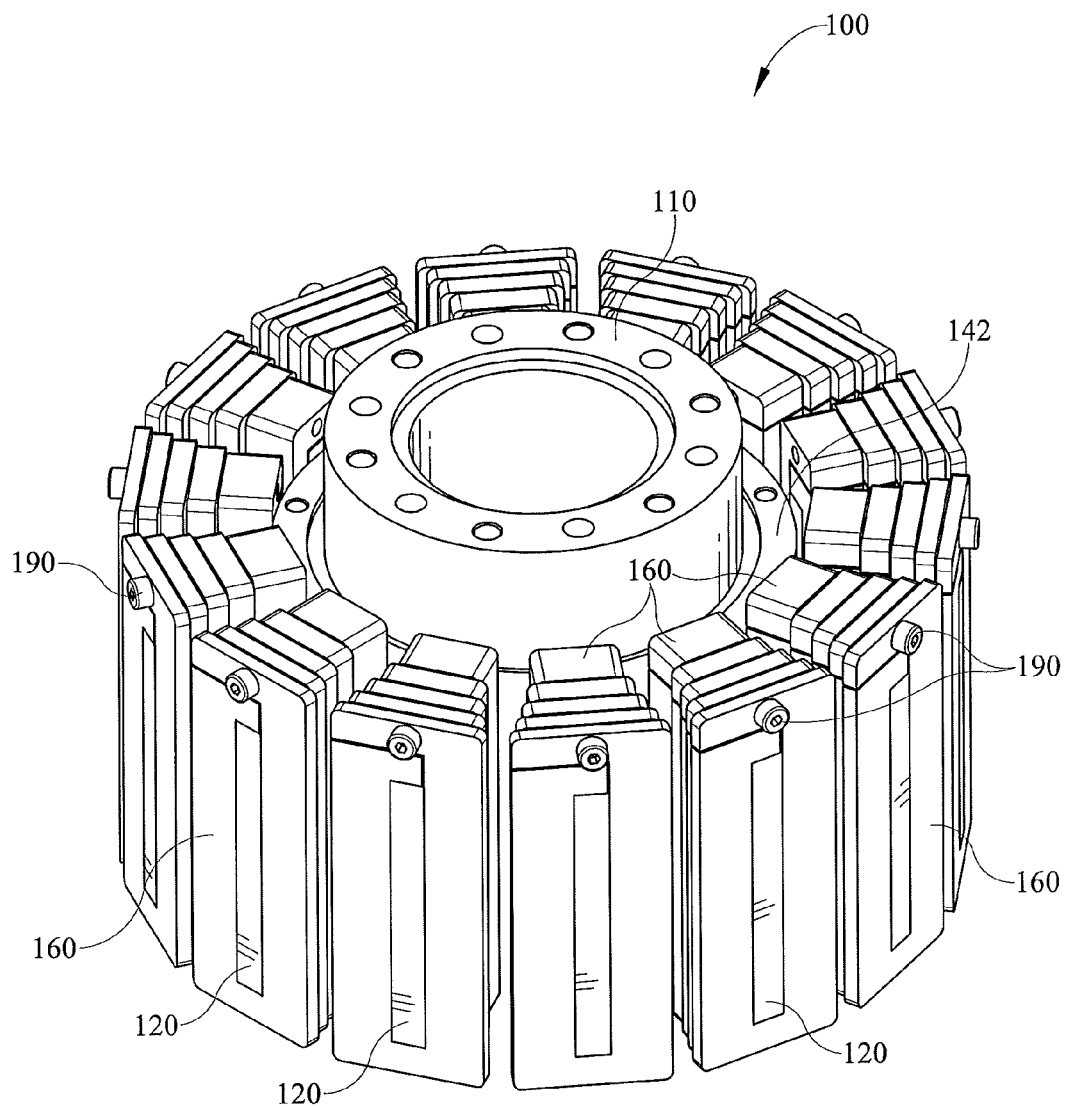
FIG. 29 is a perspective view of an assembled electric machine in accordance with one embodiment of the present invention.

An assembled series of windings 160 in accordance with one embodiment of the present invention are depicted in FIGS. 12-14. In this embodiment of the invention the radially innermost winding 160 (the winding closest to stator 100 hub 110) has a greater thickness T than the radially outermost winding 160. Additionally, since the radially outward windings 160 have a larger perimeter than the thicker inner windings 160, a plurality of windings 160 having differing thicknesses may be sized to have identical cross-sectional areas, thereby providing for constant electrical resistance throughout each winding 160. The modular assembly and construction of windings 160 produced in accordance with the instant invention provides a simple and economical system and method for winding a stator, whereby each set of windings 160 may readily be assembled and installed on stator 110 with relatively few tools and a minimum of labor.

FIGS. 13 and 14 depict an exemplary stator assembly 100 having a plurality of stator teeth 120 each wound with a plurality of modular windings 160. windings 160 are readily assembled onto stator teeth 120 by simply stacking the desired thickness/width winding 160 onto a stator tooth 120 and inserting fasteners 190 through apertures 172 and 182 of upper and lower flanges 170, 180, and securing the entire assembly by tightening fasteners 190. The modular construction of windings 160 permit a simple, economical and labor saving stator 100 assembly, in comparison with conventionally wound stators. Furthermore, the windings 160 of the present invention eliminate the need for end windings, thereby reducing motor size.

Referring again to FIGS. 4-8 and 15-18, and in accordance with one embodiment of the invention, windings 160 include upper and lower flanges 170, 180 having a conductive pads 202 or protrusions on one side of each flange 170, 180 around apertures 172, 182, and complementary recesses 203 on opposed sides thereof. Conductive pads 202 are disposed on lower flange 170 on a first side of winding 160, and disposed on upper flange 180 on a second side of winding 160. In this fashion, each winding 160 will have a conductive pad or protrusion 202 on upper flange 170 around aperture 172 on one side of winding 160. On the other side of winding 160, a conductive pad 202 is disposed around aperture 182 of lower flange 180. In one embodiment of the invention, conductive pads 202 may comprise dimples or protrusions extending outwardly from flanges 170, 180.

As seen in FIGS. 4-8 windings having conductive pads 202 may be assembled by orienting windings 160 such that pads 202 on lower flanges 180 align and touch when assembled, and corresponding pads 202 on upper flanges 170 (on opposite sides of windings 160) also align and touch. In accordance with one embodiment of the invention conductive pads 202 and recesses 203 may be provided with a highly machined surface finish to promote solid electrical contact there between. Accordingly, windings 160 constructed according to this embodiment of the invention do not require conductive washers or other equivalent components to ensure good electrical contact between adjacent windings 160, thereby further simplifying winding 160 assembly and reducing labor and material costs.

Figure 9:
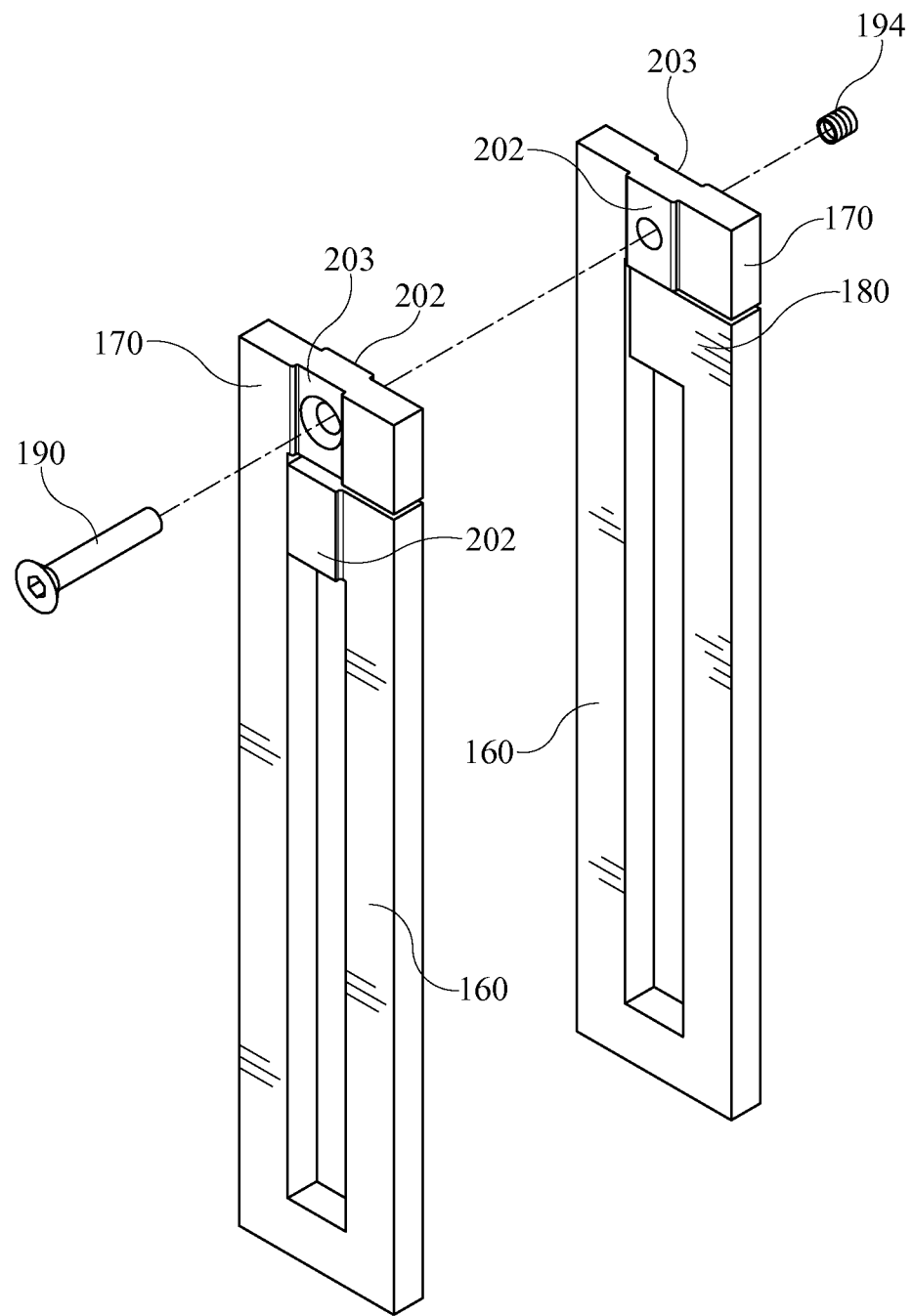
FIG. 9 is an exploded view of a winding assembly in accordance with one embodiment of the present invention.
Figure 10:
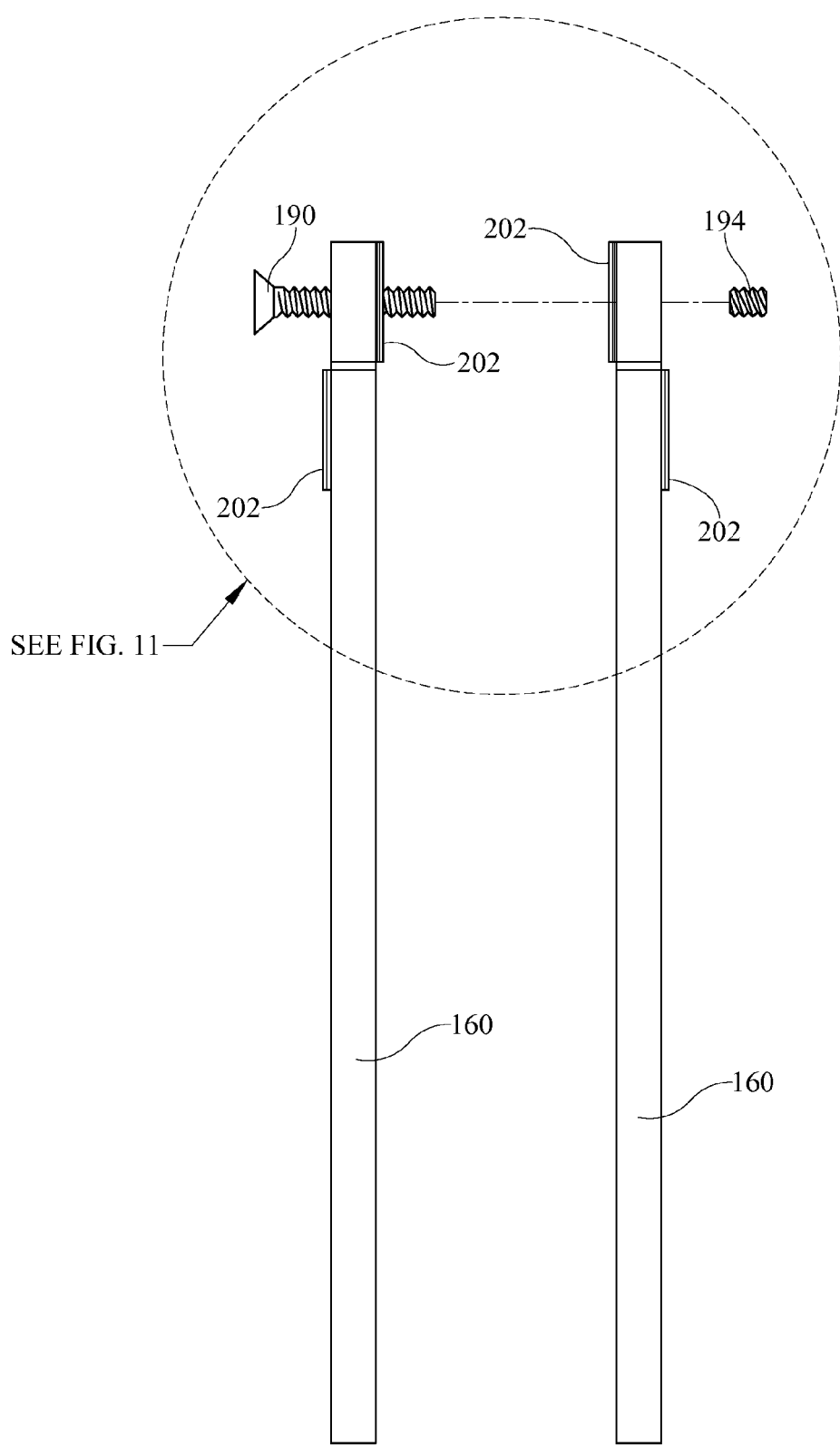
FIG. 10 is a side view of a winding assembly in accordance with one embodiment of the present invention.
Figure 11:
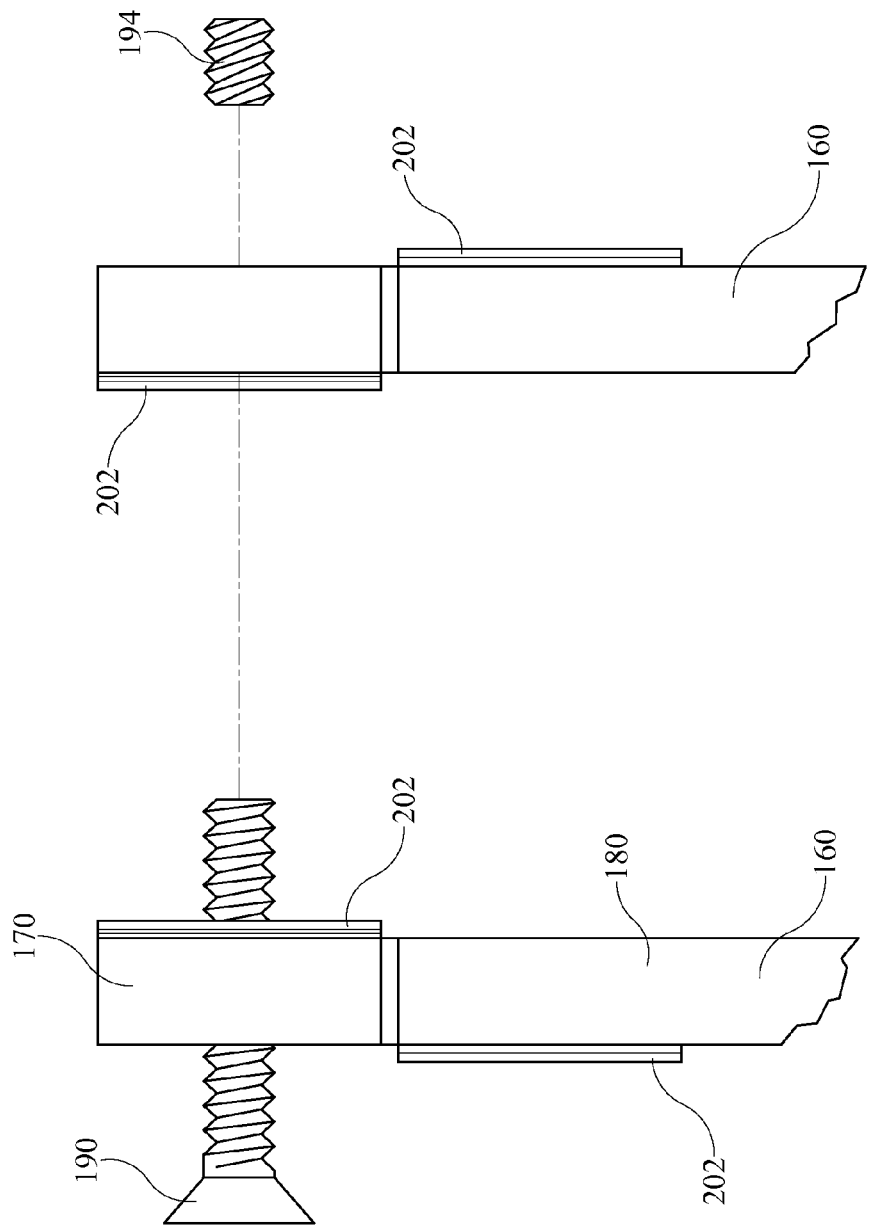
FIG. 11 is a detailed view of a winding assembly in accordance with one embodiment of the present invention.

FIGS. 9-11 depict one embodiment of the present invention wherein fastener fastener 190 comprises a heli-coil fastener and concomitant heli-coil insert 194 that secures windings 160 to stator teeth 120. This embodiment of the invention provides for secure tightening of conductive pads 202 to make consistent electrical contact between adjacent windings.

Referring now to FIGS. 19-29, and in accordance with a yet further embodiment of the invention, windings 160 may comprise upper and lower flanges 170 and 180 each having a shaped aperture 220 extending through each flange 170, 180. In one embodiment of the invention shaped apertures 220 are generally rectangular in cross-section. While apertures 220 may be oriented in any direction, in one embodiment of the invention aperture 220 in upper flange 170 is oriented horizontally, while aperture 220 in lower flange 180 is oriented vertically.

Aperture 220 is shaped to engage complementary upper and lower keys 230, depicted in FIGS. 24-28. Keys 230 may be used instead of fasteners 190 to secure adjacent windings 160 together, thereby completing a conductive path through adjacent windings. Key 230 may comprise an aperture 232 that may be utilized to connect key 230 to a source of electrical power by securing a lug there through, or an equivalent electrical connection. Keys 230 may be oriented in a similar fashion to flange apertures 220, so that windings 160 engage upper and lower keys 230 to secure adjacent windings 160 together. As shown in the FIGS. 19-25, rectangular aperture 220 of lower flange 180 is oriented with its long axis generally vertical, while rectangular aperture 200 of upper flange 170 is oriented with its long axis generally horizontal. Similarly, keys 230 (which are shown to be generally rectangular in cross-section) are oriented to engage their complementary flange apertures 220.

Key 230 may be sized to be slightly larger than the perimeter of flange apertures 220, and have a length that spans a pair of adjacent winding 160 apertures 220 thereby providing for a press-fit construction that provides excellent electrical contact between keys 230 and flanges 170, 180 of windings 160. In this embodiment of the invention, keys 230 may be comprised of a relatively soft conductive material, such as copper, bronze, aluminum, or any one of many known conductive materials. Additionally, keys 230 may have knurled or corrugated exterior surfaces to facilitate good contact with the interiors of aperture 220 when keys 230 are press-fit into apertures 220. Furthermore, while keys 230 and flange apertures 220 are shown as being generally rectangular in cross-section, a plurality of different shapes may be utilized for keys 230 and apertures 220 without departing from the scope o the invention.

In a yet further embodiment of the invention, keys 230 may form an integral part of the windings by sintering, welding, or soldering keys 230 into winding 160 apertures 220. Additionally, in another embodiment of the invention, keys 230 may be sized so that the cross-sectional area of keys 230 is identical to the cross-sectional area of windings 160, thereby providing for a current path through windings 160 and keys 230 that has a substantially constant resistance throughout. This feature of the present invention provides a winding 160 system that does not have any high temperature areas due to resistive heating, and thus provides for a more efficient use of electrical power and a consistent electromagnetic field throughout stator assembly 100.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A modular winding system for an electric machine having a rotor and stator, said stator having a plurality of teeth extending radially there from comprising:
    a plurality of electrically conductive windings each having an aperture therein shaped to engage a stator tooth, an upper and lower flange separated by an insulating gap, and first and second opposed legs connected at bottom portions thereof, said first leg secured to said upper flange at an upper portion thereof and said second leg secured to said lower flange at an upper portion thereof;
    wherein said upper flange includes a raised conductive pad on a first side, and said lower flange includes a raised conductive pad on a second side, so that an adjacent pair of windings have either upper flange pads or lower flange pads in contact with each other, thereby providing an electrical current path between adjacent windings; and
    wherein a predetermined number of said windings are disposed over each of said stator teeth and wherein each of said windings disposed on a stator tooth are in series electrical contact with each other to provide an electrical current path.

2. The modular winding system in claim 1 wherein a one of said predetermined number of windings disposed over each stator tooth comprises an electrical lead for connecting to a source of electrical current.

3. The modular winding in claim 1 wherein said lower flange and said first and second opposed legs define an aperture shaped to accept said stator tooth.

4. The modular winding in claim 1 wherein said upper and lower flanges comprise an aperture for accepting a fastener to secure adjacent windings together.

5. The modular winding system in claim 1 wherein said raised conductive pads are positioned around said apertures of said upper and lower flanges.

6. A modular winding system for an electric machine having a rotor and stator, said stator having a plurality of teeth extending radially there from comprising:
    a plurality of conductive windings comprising:
        an upper flange terminating at a point in a first leg, said upper flange having first and second opposed sides, and having an electrically conductive raised contact pad on said first side thereof and a recessed area on a second side thereof, whereby said contact pads of adjacent windings contact each other to form a current path;
        a lower flange terminating at a point in a second leg spaced from said first leg, said lower flange having first and second opposed sides, and having an electrically conductive raised contact pad on said first side thereof and a recessed area on a second side thereof, whereby said lower flange contact pads of adjacent windings contact each other to form a current path; and a bottom portion disposed between said first and second opposed legs wherein said upper flange, said first leg, said bottom portion, said second leg and said lower flange define a serial current path and wherein said said first leg, said bottom portion, said second leg and said lower flange define an aperture that is positioned over said stator teeth.

7. The modular winding system in claim 6 comprising:
an aperture disposed through said upper flange; and
an aperture disposed through said lower flange whereby a pair of fasteners can be inserted through the aligned apertures of a plurality of adjacent windings to secure said windings together and create a serial conductive path therethrough.

8. The modular winding system in claim 6 comprising:
plurality of windings having a plurality of legs increasing widths, thereby providing wider windings disposed at a radially outward portion of said stator teeth than at a radially inward portion thereof.

9. A modular winding system for an electric machine having a rotor and stator, said stator having a plurality of teeth extending radially there from comprising:
a plurality of conductive windings comprising:
an upper flange having a shaped aperture therein, said upper flange terminating at a point in a first leg;
a lower flange having a shaped aperture therein, said lower flange terminating at a point in a second leg spaced from said first leg; and
a bottom portion disposed between said first and second opposed legs wherein said upper flange, said first leg, said bottom portion, said second leg and said lower flange define a serial current path and wherein said said first leg, said bottom portion, said second leg and said lower flange define an aperture that is positioned over said stator teeth; and
a plurality of keys shaped to engage said upper flange shaped apertures to electrically connect adjacent windings; and
a plurality of keys shaped to engage said lower flange shaped apertures to electrically connect adjacent windings.

10. The modular winding system in claim 9 wherein said plurality of keys have a cross-sectional area substantially the same as the cross-sectional area of said opposed legs of said windings.

\* \* \* \* \*